US008787313B2

(12) United States Patent
Wu et al.

(10) Patent No.: US 8,787,313 B2
(45) Date of Patent: Jul. 22, 2014

(54) METHOD, NETWORK SYSTEM AND DESTINATION NETWORK FOR TRANSMITTING QOS DURING A HANDOVER PROCESS BETWEEN SYSTEMS

(75) Inventors: Wenfu Wu, Shanghai (CN); Weihua Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/187,227

(22) Filed: Jul. 20, 2011

(65) Prior Publication Data

US 2011/0275377 A1 Nov. 10, 2011

Related U.S. Application Data

(63) Continuation of application No. 12/493,451, filed on Jun. 29, 2009, now Pat. No. 8,027,314, which is a continuation of application No. PCT/CN2008/000261, filed on Feb. 1, 2008.

(30) Foreign Application Priority Data

Feb. 2, 2007 (CN) .......................... 2007 1 0003323

(51) Int. Cl.
*H04W 4/00* (2009.01)
(52) U.S. Cl.
USPC .......................................................... 370/331
(58) Field of Classification Search
None
See application file for complete search history.

(56) References Cited

U.S. PATENT DOCUMENTS

| 6,771,964 | B1 | 8/2004 | Einola et al. |
| 2002/0176370 | A1 | 11/2002 | Ohba et al. |
| 2004/0008689 | A1 | 1/2004 | Westphal et al. |
| 2005/0201324 | A1 | 9/2005 | Zheng |
| 2007/0025297 | A1 | 2/2007 | Lee et al. |
| 2007/0213059 | A1 | 9/2007 | Shaheen |
| 2007/0291695 | A1* | 12/2007 | Sammour et al. ............. 370/331 |
| 2008/0025263 | A1* | 1/2008 | Pelkonen ...................... 370/332 |
| 2008/0037436 | A1 | 2/2008 | Liu |
| 2008/0184032 | A1* | 7/2008 | Li et al. ......................... 713/171 |

(Continued)

FOREIGN PATENT DOCUMENTS

| CN | 1382355 A | 11/2002 |
| CN | 1618025 A | 5/2005 |

(Continued)

OTHER PUBLICATIONS

1st Office Action in corresponding Canadian Application No. 2,673,956 (Jan. 30, 2012).

(Continued)

*Primary Examiner* — Otis L Thompson, Jr.
(74) *Attorney, Agent, or Firm* — Leydig, Voit & Mayer, Ltd.

(57) ABSTRACT

A method for transmitting quality of service (QoS) during a handover process between systems and a network system and a destination network thereof are provided, which enable the QoS to be transmitted to a second access network during a handover process of a user equipment (UE) between systems. The method comprises: a second network mobility management network element acquires QoS of a UE during a handover process of the UE from a first network to a second network; and the second network mobility management network element transmits the acquired QoS to the second network access network and/or a user plane network element.

7 Claims, 14 Drawing Sheets

(56) References Cited

U.S. PATENT DOCUMENTS

| | | | |
|---|---|---|---|
| 2008/0188223 A1* | 8/2008 | Vesterinen et al. | 455/436 |
| 2009/0275309 A1* | 11/2009 | He | 455/410 |
| 2010/0246533 A1* | 9/2010 | Lundin et al. | 370/332 |

FOREIGN PATENT DOCUMENTS

| | | |
|---|---|---|
| CN | 1761228 A | 4/2006 |
| CN | 1829191 A | 9/2006 |
| CN | 1838620 A | 9/2006 |
| CN | 1852586 A | 10/2006 |
| CN | 1901468 A | 1/2007 |
| WO | WO 01/22764 A1 | 3/2001 |
| WO | WO 2005/089216 A2 | 9/2005 |
| WO | WO 2007016841 | 2/2007 |

OTHER PUBLICATIONS

Corresponding U.S. Appl. No. 12/493,451 (Oct. 17, 2011).

$2^{nd}$ Office Action in corresponding Chinese Application No. 200710003323.6 (Oct. 9, 2010).

Extended European Search Report in corresponding European Application No. 08706446.5 (Dec. 2, 2010).

Written Opinion of the International Searching Authority in corresponding PCT Application No. PCT/CN2008/000261 (May 22, 2008).

International Search Report in corresponding PCT Application No. PCT/CN2008/000261 (May 22, 2008).

"3GPP TS 23.060—3rd Generation Partnership Project; Technical Specification Group Services and System Aspects; General Packet Radio Service (GPRS); Service description; Stage 2 (Release 6)," Jun. 2005, Version 6.9.0, $3^{rd}$ Generation Partnership Project, Valbonne, France.

"3GPP TR 23.882—3rd Generation Partnership Project; Technical Specification Group Services and System Aspects; 3GPP System Architecture Evolution: Report on Technical Options and Conclusions (Release 7)," Nov. 2006, Version 1.5.0, $3^{rd}$ Generation Partnership Project, Valbonne, France.

Aggarwal et al., "BFD for MPLS LSPs," *IETF Network Working Group (Draft)*, 1-13 (Jun. 20, 2008) http://draft-ietf-bfd-mpls-07.txt.

Pan et al., "Fast Reroute Extensions to RSVP-TE for LSP Tunnels," *IETF Network Working Group RFC* 4090, 1-38 (May 2005).

Yu, The Realization of OAM and Fault Detection in MPLS Network, *Telecommunication World*, 6(126): 88-89 (Jun. 30, 2005).

Katz, D., et al., "RFC 5883—Bidirectional Forwarding Detection (BFD) for Multihop Paths," Jun. 2010, Internet Engineering Task Force, Fremont California.

Katz, D., et al., "Bidirectional Forwarding Detection—Internet Draft," Mar. 2005, The Internet Society, Reston, VA.

Katz, D., et al., "BFD for IPv4 and IPv6 (Single Hop)—Internet Draft," Mar. 2005, The Internet Society, Reston, VA.

Awduche, D., et al., "RSVP-TE: Extensions to RSVP for LSP Tunnels," Dec. 2001, The Internet Society, Reston, VA.

Office action from the Chinese Patent Office in corresponding Chinese Patent Application No. 2007101058103 (Jan. 29, 2010).

Written Opinion from the International Searching Authority in corresponding PCT Application No. PCT/CN2008/001041 (Aug. 27, 2008).

Corresponding U.S. Appl. No. 12/493,472.

\* cited by examiner

METHOD, NETWORK SYSTEM AND DESTINATION NETWORK FOR TRANSMITTING QOS DURING A HANDOVER PROCESS BETWEEN SYSTEMS

CROSS REFERENCE TO RELATED APPLICATIONS

This application is a continuation of U.S. patent application Ser. No. 12/493,451, filed on Jun. 29, 2009, which is a continuation of International Application No. PCT/CN2008/000261, filed on Feb. 1, 2008. The International Application claims priority to Chinese Patent Application No. 200710003323.6, filed on Feb. 2, 2007. The aforementioned patent applications are hereby incorporated by reference in their entireties.

FIELD OF THE TECHNOLOGY

The present disclosure relates to the field of communication, and more particularly to a method, a network system and a destination network for transmitting QoS during a handover process between systems.

BACKGROUND

As the trend and target of the next generation digital communication technology innovation and development, the $3^{rd}$-Generation Partnership Project (3GPP) is one of the hotspots in the world currently. The 3GPP network structure basically comprises the circuit switched (CS) domain and the packet switched (PS) domain. FIG. 1 is a schematic view of the network structure of the 3GPP communication system in the prior art. The network structure is similar to the second generation mobile communication system, and comprises the Universal Terrestrial Radio Access Network (UTRAN), GSM/EDGE Radio Access Network (GERAN), core network (CN) and user equipments (UEs). The GERAN/UTRAN is adapted to implement all radio-related functions, while the CN processes all the voice calls and data connections in the General Packet Radio Service/Universal Mobile Telecommunication Service (GPRS/UMTS) system, and to implement the functions of handover and routing with external networks. Logically, the CN is classified into the CS domain supporting voice services and the PS domain supporting data services. The CS domain comprises nodes such as the Mobile Switching Center Server (MSC-Server), Media Gateway (MGW) and Gateway Mobile Switching Center Server (GMSC-Server). The MSC-Server is adapted to transmit control plane data of the CS domain, and to implement the functions of mobility management, call control, authentication and encryption and the like. The GMSC-Server is adapted to implement the control plane functions of call control and mobility control of the GMSC. The MGW is adapted to implement the transmission of the user plane data. The PS domain comprises nodes such as the Serving GPRS Supporting Node (SGSN) and the Gateway GPRS Supporting Node (GGSN). The GGSN is adapted to interface with the external network, and to implement the transmission of the user plane data. The location of the SGSN in the PS domain is similar to the location of the MSC-Server in the CS domain, and the core functions of the SGSN is to implement the functions of routing and forwarding, mobility management, session management and user information storage, etc. The Home Location Register (HLR) is adapted to store the user subscription information, and the CS and PS domains both use the HLR.

FIG. 2 is a schematic view of the policy and charging control (PCC) network structure of the 3GPP system. The PCC system network comprises logic entities such as the Application Function (AF), the Policy and Charging Rules Function (PCRF), the Subscription Profile Repository (SPR), the Policy and Charging Enforcement Function (PREF), the Online Charging System (OCS), the Offline Charging System (OFCS), and the Gateway (GW). The AF is a network element providing applications that require dynamic policy control. The PCRF mainly performs the policy control decision and stream charging control function. The SPR is adapted to store the PCC-related subscription data needed by the PCRF. The PCEF mainly provides the service data stream detecting, policy enforcement and stream charging functions, which is a function entity located on the gateway device. The OCS is responsible for the online charging function. The OFCS is responsible for the offline charging function.

In order to enhance the competitiveness of the future network, the 3GPP is researching on a new evolution network architecture, comprising the System Architecture Evolution (SAE) and the Long Term Evolution (LTE) of the access network. The evolved access network is referred to as E-UTRAN, and the evolved packet core network architecture is as shown in FIG. 3, comprising logical function entities such as the Mobility Management Entity (MME), the User Plane Entity (UPE) and the Inter Access System Anchor (IASA). The MME is responsible for mobility management of the control plane, comprising the user context and mobile state management, and is responsible for allocating temporary user identities, which is corresponding to the control plane part of the internal SGSN of the current GPRS/UMTS system. The UPE is responsible for initiating paging for downlink data in the idle state, and managing and storing IP bearer parameters and internal network routing information, which is corresponding to the data plane part of the internal SGSN and GGSN of the current GPRS/UMTS system. The IASA acts as the user plane anchor between different access systems. The 3GPP Anchor logical function entity is the user plane anchor between the 2G/3G access system and the LTE access system. The SAE Anchor logical function entity is the user plane anchor between the 3GPP access system and the non-3GPP access system. The PCRF is responsible for policy control decision and stream charging control function. The Home Subscriber Server (HSS) is adapted to store the user subscription information.

Referring to FIG. 4, the process for the handover from the GERAN/UTRAN system to the SAE/LTE system under the MME/UPE separation architecture in the prior art comprises the following steps.

In step 1, the IP bearer service is established between the UE, the 2G/3G access system, the 2G/3G SGSN and the SAE UPE/IASA.

In step 2, the 2G/3G access system decides to initiate a handover process to hand over to the LTE access system (Handover Initiation).

In step 3, the 2G/3G access system decides to initiate a handover request message to the 2G/3G SGSN (Handover Required). The 2G/3G SGSN selects an MME to process the handover.

In step 4, the 2G/3G SGSN sends a handover preparation request message comprising the UE context information to the selected MME. The MME creates the UE context and sends the handover preparation request message to the LTE access system (Handover Preparation Request).

In step 5, the LTE access system reserves the user plane resources after receiving the handover preparation message sent by the MME, and establishes the radio bearer (LTE access reserves UP resources).

In step 6, the LTE access system sends a handover preparation confirm message to the MME, and the MME sends the handover preparation confirm message to the 2G/3G SGSN (Handover Preparation Confirm).

In step 7, the 2G/3G SGSN initiates a handover command to the UE (Handover Command).

In step 8, Means to minimize loss of data, such as data forwarding or bi-casting process, is performed. The lossless data processing is not the content of the present disclosure, and will not be described here.

In step 9, the LTE access system detects the UE (UE Detection).

In step 10, the LTE access system sends a handover complete message to the MME, and the MME sends the handover complete message to the 2G/3G SGSN (Handover Complete).

In step 11, the 2G/3G SGSN sends a handover complete acknowledgement message to the MME (Handover Complete Ack).

In step 12, the route from the UPE/IASA user plane to the LTE access system is established (User Plane route update).

In step 13, the source 2G/3G access system releases the resources (Resource Release).

In step 14, the IP bearer service is established between the UE, the LTE access system and the UPE/IASA.

During researches and applications, the inventors find a problem in the process described above, that is, multiple SAE bearers in the existing SAE system share the Quality of Service (QoS) parameters such as the Aggregate Maximum Bit Rate (AMBR). These SAE bearers have no separate QoS parameters such as the Maximum Bit Rate (MBR) in the LTE access system. In the current 2G/3G access systems, the bearers all use separate QoS parameters such as the MBR, but no bear shares QoS parameters such as the MBR, and the current 2G/3G subscription data has no QoS parameters such as the AMBR. Thus, during the handover from the 2G/3G system to the SAE system, the SAE system cannot determine QoS parameters such as the AMBR when establishing the bearer.

SUMMARY

Embodiments of the present disclosure provide a method, a network system and a destination network for transmitting QoS during a handover process between systems, which can transmit QoS parameters to a second network access network and/or a user plane network element during a UE's handover process between systems.

The method according to an embodiment of the present disclosure is as follows: during a handover process of a UE from a first network to a second network, a second network mobility management network element acquires QoS of the UE; and the second network mobility management network element transmits the acquired QoS to a second network access network and/or a user plane network element.

Alternatively, during a handover process of a UE from a first network to a second network, a second network access network and/or a user plane network element acquire QoS of the UE according a preset policy.

The network system according to an embodiment of the present disclosure comprises a user terminal, a first network and a second network. The second network comprises a second network mobility management network element and a second network access network and/or a user plane network element;

The second network mobility management network element is adapted to acquire QoS of the UE during a handover process of the UE from the first network to the second network, and transmit the QoS to the second network access network and/or the user plane network element;

The second network access network and/or the user plane network element are adapted to receive the QoS transmitted by the second network mobility management network element.

Alternatively, the network system according to an embodiment of the present disclosure comprises a UE, a first network and a second network. The second network comprises a second network mobility management network element and a second network access network and/or a user plane network element;

The second network access network element and/or the user plane network element are adapted to acquire QoS of the UE according to a preset policy during a handover process of the UE from the first network to the second network.

The acquiring the QoS of the UE according to the preset policy may use one of the following methods:

In a first method, default QoS configured in the second network access network element and/or the user plane network element is used as the QoS of the UE.

In a second method, the second network further comprises a second network mobility management network element. The second network access network element and/or the user plane network element acquire QoS parameter values transmitted by the second network mobility management network element, and accumulate the acquired QoS parameter values as the QoS of the UE.

In a third method, the second network further comprises a second network mobility management network element. The second network access network element and/or the user plane network element acquire the QoS parameter values transmitted by the second network mobility management network element, and select the maximum value among the values as the QoS of the UE.

Further, the network system further comprises a subscription database. After the handover process of the UE with the QoS acquired according to the preset policy is completed, the second network mobility management network element acquires the subscribed QoS of the UE from the subscription database, and transmits the QoS to the second network access network element and/or the user plane network element.

Alternatively, after the handover process of the UE with the QoS acquired according to the preset policy is completed, the second network mobility management network element acquires the subscribed QoS of the UE from the subscription database, and compares the subscribed QoS of the UE with the QoS acquired according to the preset policy, if the comparison result indicates that they are inconsistent, the second network mobility management network element transmits the subscribed QoS of the UE to the second network access network and/or the user plane network element.

The destination network according to an embodiment of the present disclosure comprises a mobility management network element. The mobility management network element is adapted to acquire QoS of a UE that initiates handover, and transmit the QoS to an access network and/or a user plane network element. The access network and/or the user plane network element is adapted to receive the QoS transmitted by a core network.

The destination network according to an embodiment of the present disclosure comprises an access network and/or a user plane network element. The access network and/or the user plane network element acquires QoS of a UE according to a preset policy during a handover process of the UE from a first network to a second network.

A mobility management network element according to an embodiment of the present disclosure comprises a pre-acquiring unit and a transmitting unit. The pre-acquiring unit is adapted to acquire QoS of a UE that initiates handover according to a preset policy. The transmitting unit is adapted to send the QoS acquired by the pre-acquiring unit.

In the embodiments of the present disclosure, during a handover process of the UE from the first network to the second network, the second network mobility management network element acquires the QoS of the UE, and transmits the acquired QoS to the second network access network and/or the user plane network element. Thereby, the second network access network and/or the user plane network element can acquire the QoS. Alternatively, during a handover process of the UE from the first network to the second network, the second network access network and/or the user plane network element acquire the QoS of the UE according to the preset policy.

BRIEF DESCRIPTION OF THE DRAWINGS

The present disclosure will become better understood from the detailed description given herein below for illustration only, and thus are not limitative of the present disclosure, and wherein.

DETAILED DESCRIPTION

Figure 5:
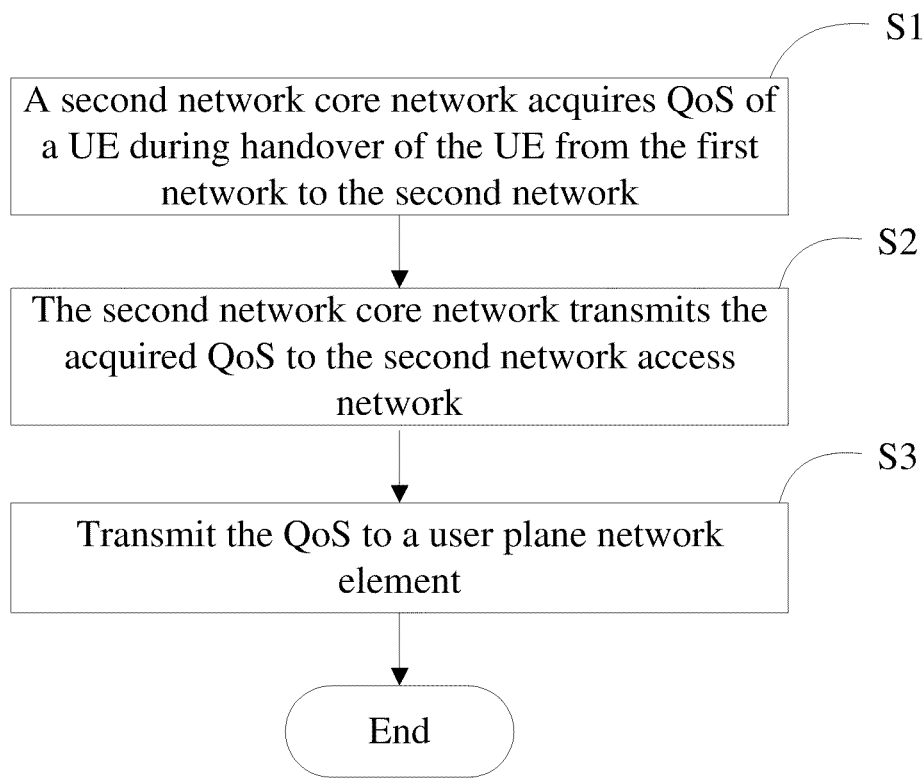
FIG. 5 is a flow chart of the steps of the method according to a first embodiment of the present disclosure.

In order to transmit the QoS to a second network access network during a handover process of the UE between systems, the embodiments of the present disclosure provide a method of transmitting QoS during a handover process between systems. Referring to FIG. 5, the method according to the first embodiment comprises the following steps.

In S1, during a handover process of a UE from a first network to a second network, a second network mobility management network element acquires the QoS parameters of the UE.

The second network mobility management network element can acquire the QoS parameters of the UE through the following three methods:

In the first method, during a handover process of the UE from the first network to the second network, the second network mobility management network element acquires the QoS according to a preset policy. The preset policy is to use default QoS configured in the second network mobility management network element as the QoS of the UE; alternatively, the second network mobility management network element acquires QoS parameter values transmitted by the UE from the first network, and accumulates the acquired QoS parameter values as the QoS of the UE; alternatively, the second network mobility management network element acquires the QoS parameter values transmitted by the UE from the first network, and selects the maximum value as the QoS of the UE.

In the second method, when the UE is connected to the first network, a network element of the first network acquires the subscribed QoS of the UE from a subscription database in which the QoS is configured; and during a handover process of the UE from the first network to the second network, the network element of the first network informs the second network mobility management network element of the subscribed QoS of the UE, so that the second network mobility management network element acquires the QoS of the UE.

In the third method, during a handover process of the UE from the first network to the second network, the second network mobility management network element acquires the subscribed QoS of the UE from a subscription database in which the QoS is configured. The second network mobility management network element may acquire the subscribed QoS of the UE from the subscription database in which the QoS is configured as follows: the second network mobility management network element sends an acquiring subscription data request message to the subscription database, and the subscribed QoS of the UE is carried in the subscription data returned by the subscription database; alternatively, the second network mobility management network element sends a PCC rules request message, then a PCRF acquires the subscribed QoS of the UE from the subscription database, and the PCRF sends the subscribed QoS of the UE through a response message to the second network mobility management network element; alternatively, the second network mobility management network element sends a create bearer request message to requests to create a bearer, then the PCRF acquires the subscribed QoS of the UE from the subscription database, the PCRF sends the subscribed QoS of the UE through a response message to a user plane network element, and then the user plane network element sends the subscribed QoS of the UE through a response message to the second network mobility management network element.

In S2, the second network mobility management network element transmits the acquired QoS to the second network access network.

After the second network access network acquires the QoS, the process may further comprise a step S3. In S3, the QoS is transmitted to the user plane network element.

In step S1, according the different methods for the second mobility management network element to acquire the QoS of the UE, the methods of transmitting the QoS to the user network element are also different.

In addition to the method that the second network mobility management network element sends the create bearer request message to acquire the QoS in step S1, the QoS may be transmitted to the user plane network element to modify the context of the user plane network element through the following two methods:

In the first method, the second network access network sends a route modifying message carrying the QoS to the user plane network element of the second network mobility management network element; the user plane network element modifies the corresponding QoS in the context thereof according to the QoS.

In the second method, the second network mobility management network element sends a route modifying message carrying the QoS to the user plane network element of the second network mobility management network element; the user plane network element modifies the corresponding QoS in the context thereof according to the QoS.

If the first method for the second network mobility management network element to acquire the QoS of the UE in step S1 is used, the QoS may be corrected through one of the following two methods:

In the first method, after the handover process of the user planes of the UE with the QoS acquired according to the preset policy is completed, the second network mobility management network element acquires the subscribed QoS of the UE from the subscription database, and transmits the QoS to the second network access network. Here, the second network mobility management network element acquires the subscribed QoS of the UE from the subscription database according to the third method in step S1.

In the second method, after the handover process of the user planes of the UE with the QoS acquired according to the preset policy is completed, the second network mobility management network element acquires the subscribed QoS of the UE from the subscription database, and compares the subscribed QoS of the UE with the QoS acquired according to the preset policy; if not consistent, the second network mobility management network element transmits the subscribed QoS of the UE to the second network access network. Here, the second network mobility management network element acquires the subscribed QoS of the UE from the subscription database according to the third method in step S1.

The route modifying message according to the embodiment of the present disclosure may be replaced by an update bearer request message, which is not discussed in detail in the following embodiments.

The solution of transmitting the QoS to the second network access network in the embodiment of the present disclosure may be replaced by transmitting the QoS to the user plane network element, or transmitting the QoS to the second network access network and the user plane network element, that is, transmitting the QoS to the second network access network or the user plane network element, or transmitting the QoS to the second network access network and a user plane network element (that is, transmitting the QoS to the second network access network and/or the user plane network element), which will not be discussed in detail in the following embodiments.

Through the method for transmitting the QoS according to the embodiments of the present disclosure, the second network access network and the user plane network element can acquire the QoS parameters needed by the bearer, and can implement the resource allocation for the bearer according the QoS parameters during a handover process to realize the QoS control of the bearer.

In the method according to the second embodiment, during a handover process of the UE from the first network to the second network, the second network access network element and/or the user plane network element acquire the QoS according to the preset policy. The preset policy is to use the default QoS pre-configured in the second network access network element and/or the user plane network element as the QoS of the UE; alternatively, the second network access network element and/or the user plane network element acquire the QoS parameter values transmitted by the second network mobility management network element, and accumulate the acquired QoS parameter values as the QoS of the UE; alternatively, the second network access network element and/or the user plane network element acquire the QoS parameter values transmitted by the second network mobility management network element, and select the maximum value as the QoS of the UE.

Further, the QoS may be corrected through the following two methods:

In the first method, after a handover process of the user planes of the UE with the QoS acquired according to the preset policy is completed, the second network mobility management network element acquires the subscribed QoS of the UE from the subscription database, and transmits the QoS to the second network access network and/or the user plane network element. Here, the second network mobility management network element acquires the subscribed QoS of the UE from the subscription database according to the description above.

In the second method, after a handover process of the user planes of the UE with the QoS acquired according to the preset policy is completed, the second network mobility management network element acquires the subscribed QoS of the UE from the subscription database, and compares the subscribed QoS of the UE with the QoS acquired according to the preset policy; if the comparison indicates that they are inconsistent, the second network mobility management network element transmits the subscribed QoS of the UE to the second network access network and/or the user plane network element. Here, the second network mobility management network element acquires the subscribed QoS of the UE from the subscription database according to the description above.

Figure 6:
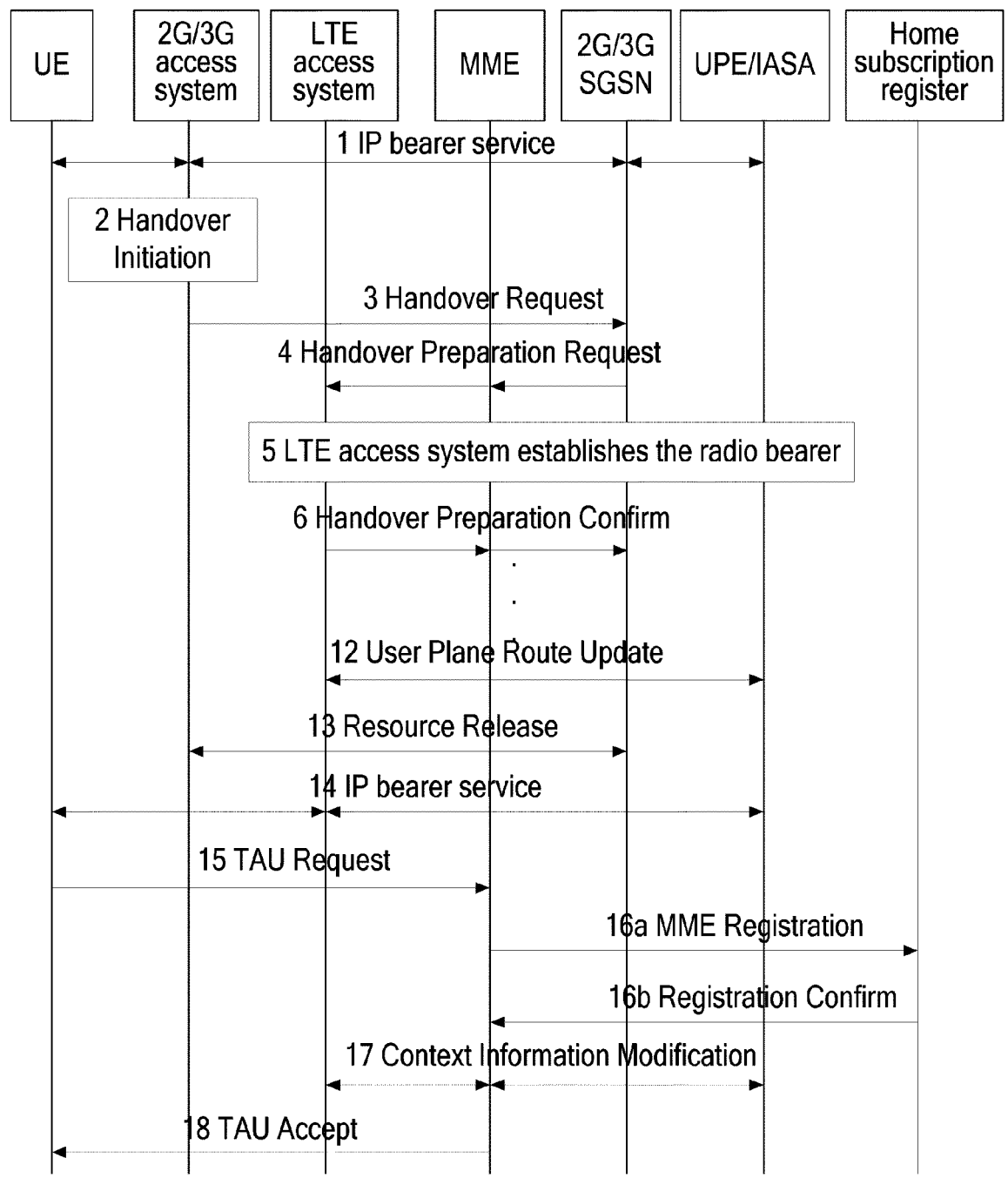
FIG. 6 is a flow chart of the signaling of the method according to a third embodiment of the present disclosure.

In the method according to the third embodiment, the AMBR parameter of the user is subscribed in an HSS, during a handover process from the 2G/3G to the SAE system, the evolved packet core network provides the AMBR parameter to the LTE access system in advance. After the handover process, the evolved core network acquires the subscription data (comprising the AMBR) of the user from HSS. If the evolved packet core network discovers that the AMBR provided in advance is not consistent with the subscribed AMBR of the user, the evolved packet core network initiates a modification process, informs the LTE access system, or a UPE/IASA, or the LTE access system and a UPE/IASA of the subscribed AMBR of the user. Referring to FIG. 6, the process comprises the following steps:

In step 1, the IP bearer service is established between the UE, the 2G/3G access system, the 2G/3G SGSN and the SAE UPE/IASA.

In step 2, the 2G/3G access system decides to initiate a handover process to hand over to the LTE access system (Handover Initiation).

In step 3, the 2G/3G access system initiates a handover Required message to the 2G/3G SGSN (Handover Required). The 2G/3G SGSN selects an MME to process the handover.

In step 4, the 2G/3G SGSN sends a handover preparation request message comprising UE context information to the selected MME, the MME creates a UE context and sends the handover preparation request message to the LTE access system (Handover Preparation Request); the handover preparation request message sent by the MME provides the AMBR parameter in advance.

The AMBR parameter provided by the handover preparation request message sent by the MME can be acquired through one of the following methods:

In the first method, a default AMBR configured in the MME is used as the AMBR used by the user in the SAE system.

In the second method, the MME acquires MBR parameters in a PDP context transmitted by the user from the 2G/3G SGSN, accumulates all the MBR parameter values as the AMBR used by the user in the SAE system.

In the third method, the MME acquires MBR parameters in a PDP context transmitted by the user from the 2G/3G SGSN, selects the maximum value as the AMBR used by the user in the SAE system.

In step 5, after receiving the handover preparation request message sent by the MME, the LTE access system reserves the resources of the user plane, and creates the radio bearer (LTE Access reserves UP resources).

In step 6, the LTE access system sends a handover preparation confirm message to the MME, and the MME sends the handover preparation confirm message to the 2G/3G SGSN (Handover Preparation Confirm).

Figure 1:
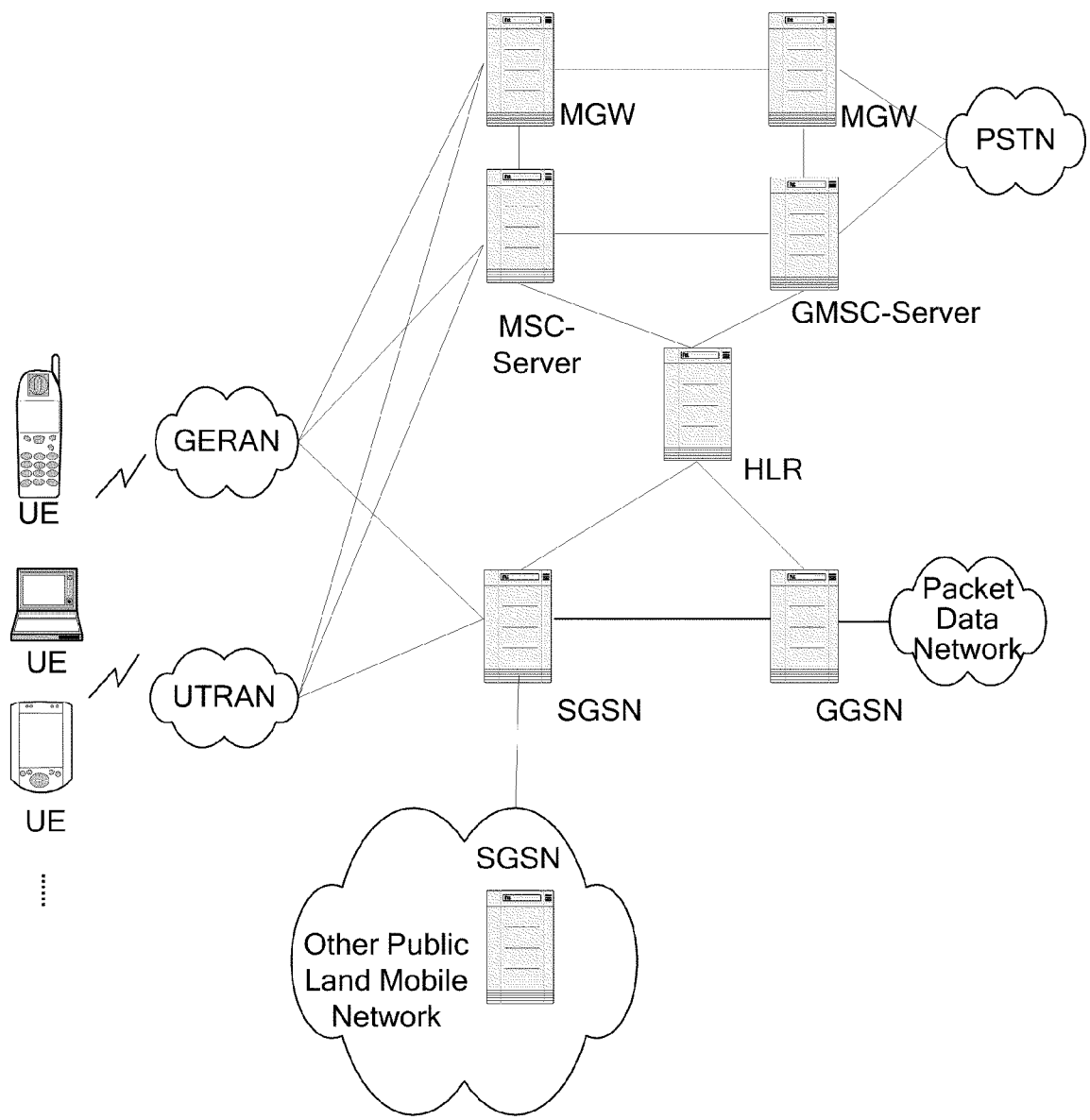
FIG. 1 is a schematic view of the 3GPP network structure in the prior art.
Figure 2:
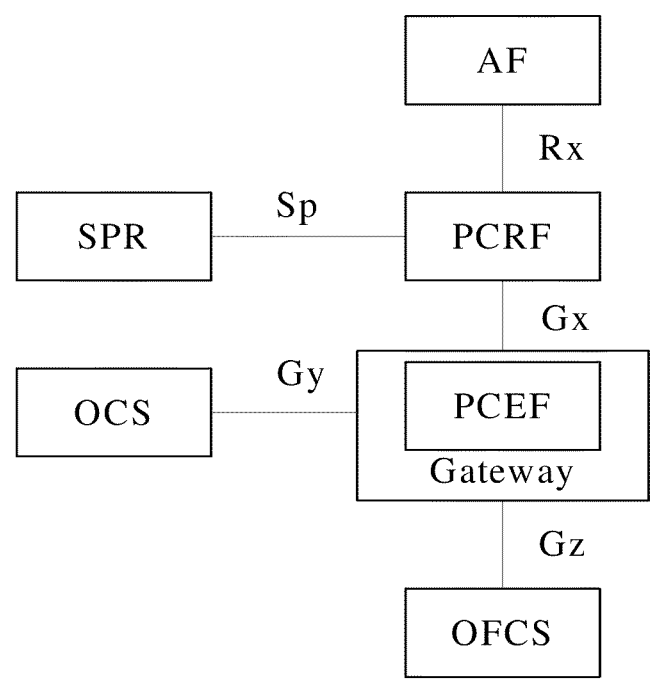
FIG. 2 is a schematic view of the 3GPP system PCC network structure in the prior art.
Figure 3:
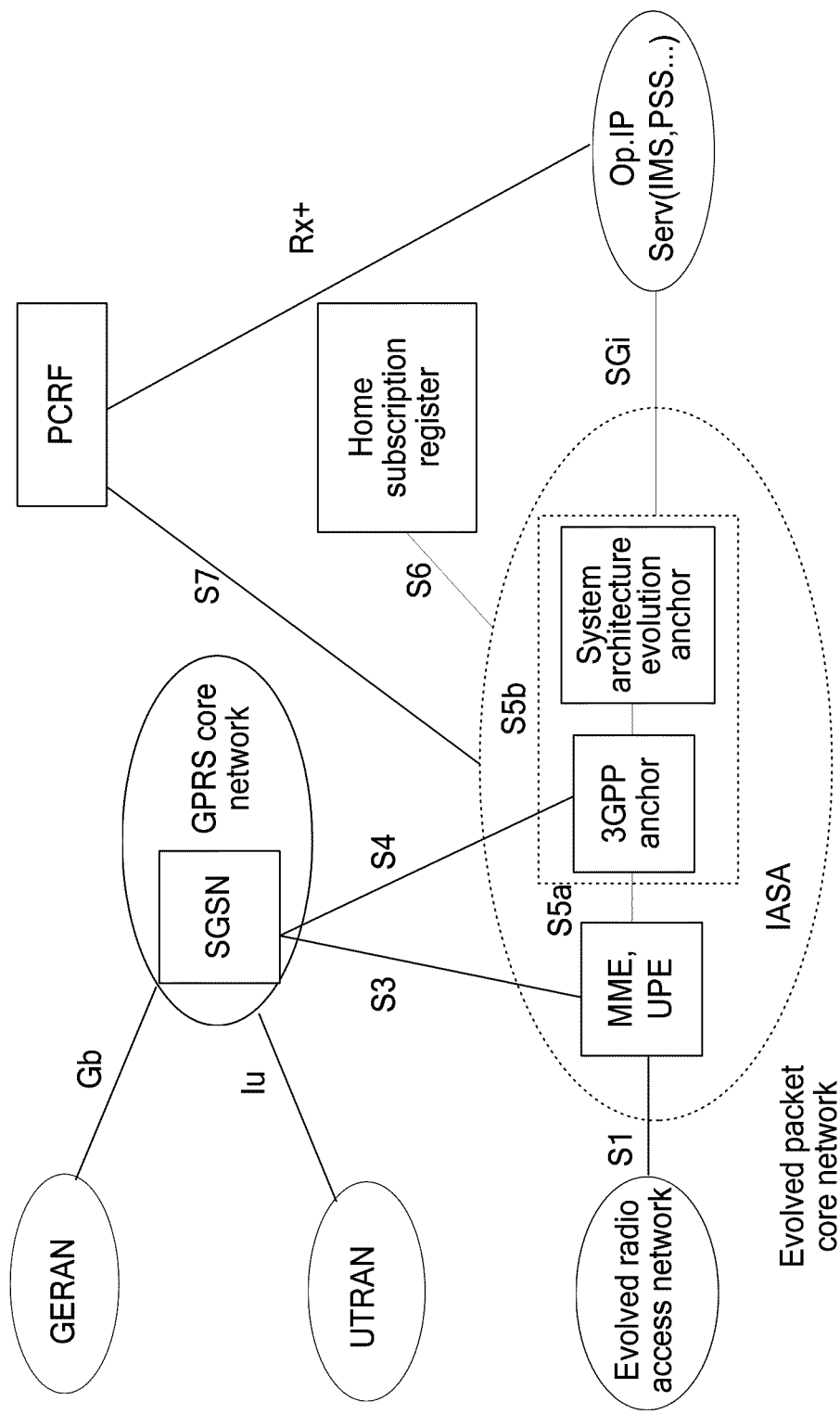
FIG. 3 is a schematic view of the evolved packet core network architecture of the prior art.
Figure 4:
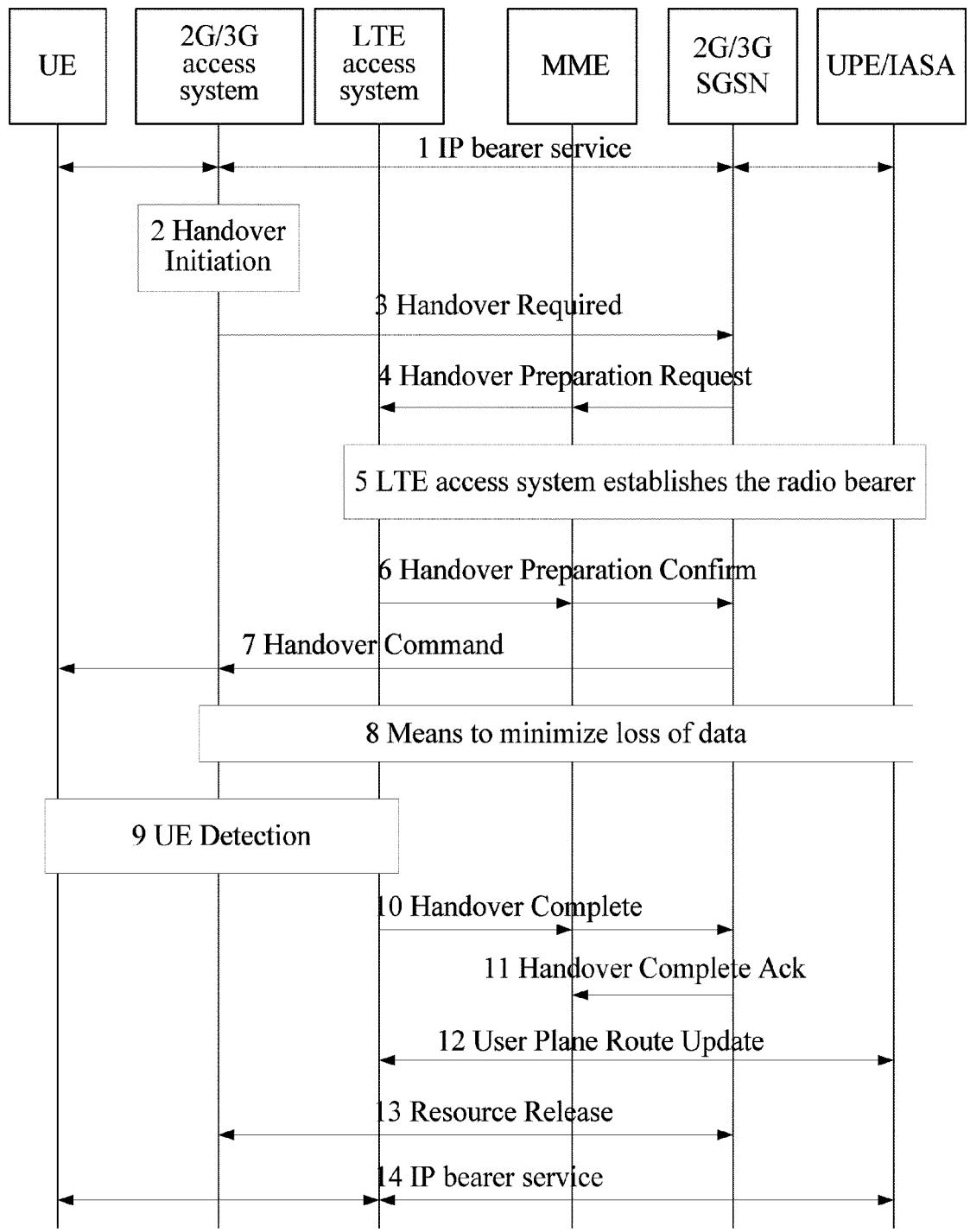
FIG. 4 is a flow chart of the process for the handover from the GERAN/UTRAN system to the SAE/LTE system under the MME/UPE separation architecture in the prior art.

Steps 7 to 11 are similar to steps 7 to 11 in FIG. 4 of the prior art, that is, the 2G/3G SGSN initiates a handover command to the UE; the LTE access system detects the UE; the LTE access system sends a handover complete message to the MME; the MME sends the handover complete message to the 2G/3G SGSN; the 2G/3G SGSN sends a handover complete confirm message to the MME (not discussed in detail). FIG. 6 does not show steps 7-11.

In step 12, the UPE/IASA establishes a route of the user plane to the LTE access system (User Plane route update), and the UPE/IASA is informed of the AMBR parameter provided in advance in this step.

Step 12 can be performed through the following methods.

In the first method, the LTE access system sends a route modification message to the UPE/IASA to modify the user plane route of the UPE/IASA to the LTE access system; the message carries the AMBR parameter provided in advance.

In the second method, the MME sends a route modification message to the UPE/IASA to modify the user plane route of the UPE/IASA to the LTE access system; the message carries the AMBR parameter provided in advance.

In step 13, the source 2G/3G access system releases the resources (Resource Release).

In step 14, the IP bearer service is established between the UE, the LTE access system, and the UPE/IASA.

In step 15, the UE sends a tracking area update (TAU) request message to the MME.

In step 16a, the MME registers itself to an HSS. In step 16b, the HSS returns a registration confirm message carrying the subscription information of the user (comprising the subscribed AMBR parameter of the user) to the MME.

In step 17, if the MME finds that the AMBR parameter used by the user is not consistent with the AMBR parameter in the user subscription information, the MME initiates a context information modification process, and informs the LTE access system and the UPE/IASA of the subscription AMBR parameter of the user.

In step 18, the MME sends a TAU accept message to the UE.

In the method according to the fourth embodiment, the AMBR parameter of the user is subscribed in an HSS. During a handover process from the 2G/3G to the SAE system, the LTE access system or the user plane network element applies the pre-configured AMBR parameter. After the handover, the evolved packet core network acquires the subscription data (comprising the AMBR) of the user from the HSS. If the evolved packet core network finds that the AMBR parameter in use provided in advance is not consistent with the subscription AMBR parameter of the user, the evolved core network initiates a modification process, and informs the LTE access system or the user plane network element of the subscription AMBR of the user. The method comprises the following steps:

In step 1, the IP bearer service is established between a UE, a 2G/3G access system, a 2G/3G SGSN and an SAE UPE/IASA.

In step 2, the 2G/3G access system decides to initiate a handover process to hand over to the LTE access system (Handover Initiation).

In step 3, the 2G/3G access system initiates a handover request message to the 2G/3G SGSN (Handover Required). The 2G/3G SGSN selects an MME to process the handover.

In step 4, the 2G/3G SGSN sends a handover preparation request message comprising UE context information to the selected MME, and the MME creates a UE context and sends the handover preparation request message to the LTE access system (Handover Preparation Request).

The LTE access system may use the AMBR parameter provided in advance. The LTE access system may acquire the AMBR parameter provided in advance through one of the following methods:

In the first method, an AMBR parameter pre-configured in the LTE access system is used as the AMBR pre-used by the user in the LTE access system.

In the second method, the LTE access system acquires MBR parameters carried by the handover preparation request message, and accumulates all the MBR parameter values as the AMBR used by the user in the LTE access system.

In the third method, the LTE access system acquires MBR parameters carried by the handover preparation request message, and selects the maximum value as the AMBR used by the user in the LTE access system.

In step 5, after receiving the handover preparation request message sent by the MME, the LTE access system reserves the resources of the user plane, and establishes the radio bearer (LTE Access reserves UP resources).

In step 6, the LTE access system sends a handover preparation confirm message to the MME, and the MME sends the handover preparation confirm message to the 2G/3G SGSN (Handover Preparation Confirm). The LTE access system may carry the AMBR parameter provided in advance in the handover preparation confirm message to the MME.

Steps 7 to 11 are similar to steps 7 to 11 in FIG. 4 of the prior art.

In step 12, the UPE/IASA establishes the route of the user plane to the LTE access system (User Plane route update), and the UPE/IASA may be informed of the AMBR parameter provided in advance in this step.

This step may be performed through the following methods.

In the first method, the LTE access system sends a route modification or update bearer request message to the UPE/IASA to modify the user plane route of the UPE/IASA to the LTE access system; the message carries the AMBR parameter provided in advance.

In the second method, the MME sends a route modification or update bearer request message to the UPE/IASA to modify the user plane route of the UPE/IASA to the LTE access system; the message carries the AMBR parameter provided in advance.

If the AMBR parameter is not carried in the route modification or update bearer request message, the UPE/IASA may use the AMBR parameter provided in advance. The UPE/IASA may acquire the AMBR parameter provided in advance through one of the following methods:

In the first method, the AMBR parameter pre-configured in the UPE/IASA is used as the AMBR pre-used by the user in the UPE/IASA.

In the second method, the UPE/IASA acquires MBR parameters carried in the route modification or update bearer request message, and accumulates all the MBR parameter values as the AMBR used by the user in the UPE/IASA.

In the third method, the UPE/IASA acquires MBR parameters carried in the route modification or update bearer request message, and selects the maximum value as the AMBR used by the user in the UPE/IASA.

If the UPE/IASA uses the AMBR parameter provided in advance, the UPE/IASA may inform the MME of the AMBR parameter provided in advance in a route modification or update bearer response message.

In step 13, the source 2G/3G access system releases resources (Resource Release).

In step 14, the IP bearer service is established between the UE, the LTE access system and the UPE/IASA.

In step 15, the UE sends a TAU request message to the MME.

In step 16a, the MME registers itself to an HSS. In step 16b, the HSS returns the registration confirm message carrying the subscription information of the user (comprising the subscribed AMBR parameter of the user) to the MME.

In step 17, if the MME finds that the AMBR parameter (that is, the AMBR parameter provided by the LTE access system or the UPE/IASA in advance) used by the user is not consistent with the AMBR parameter in the user subscription information, the MME initiates a context information modification process, and informs the LTE access system and the UPE/IASA of the subscription AMBR parameter of the user. Alternatively, the MME directly initiates a context information modification process, and informs the LTE access system and the UPE/IASA of the subscription AMBR parameter of the user.

In step 18, the MME sends a TAU accept message to the UE.

In the method according to the fifth embodiment, the AMBR is configured in an HSS; when the user registers with the 2G/3G access system, the HSS sends the subscription AMBR data of the user to an SGSN; the SGSN stores the AMBR subscription data, and transmits the data to the MME during a handover process between systems; the MME acquires the transmitted AMBR parameter, and informs the LTE access system.

Figure 7:
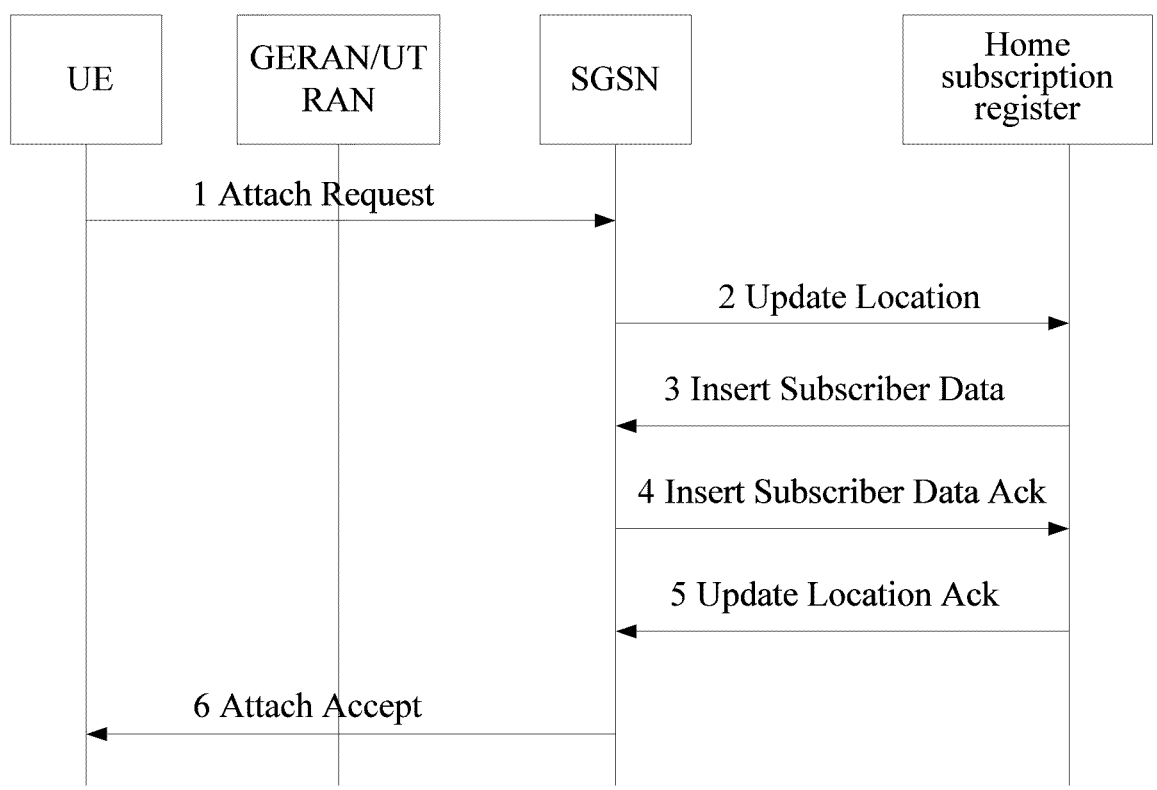
FIG. 7 is a flow chart of the attached signaling of the user in the 2G/3G access system of the method according to a fifth embodiment of the present disclosure.

Referring to FIG. 7, the attach process of the user in the 2G/3G access system comprises the following steps.

In step 1, the UE sends an attach request message to the SGSN.

In step 2, the SGSN sends a location update message to the HSS.

In step 3, the HSS inserts the subscription data of the user into the SGSN.

The informing the SGSN of the AMBR subscription data of the user may be performed through one of the following methods:

In the first method, the AMBR is subscribed in the user SAE subscription data of the HSS, and the HSS inserts the SAE subscription data of the user into the SGSN.

In the second method, the AMBR parameter of the user is added into the user 2G/3G subscription data of the HSS, and the HSS inserts the AMBR subscription data into the SGSN when inserting the 2G/3G subscription data of the user into the SGSN.

In step 4, the SGSN stores the AMBR parameter of the user in the context of the user, and then inserts a subscription data confirm message back into the HSS.

In step 5, the HSS returns a location update confirm message to the SGSN.

In step 6, the SGSN returns an attach accept message to the UE.

Figure 8:
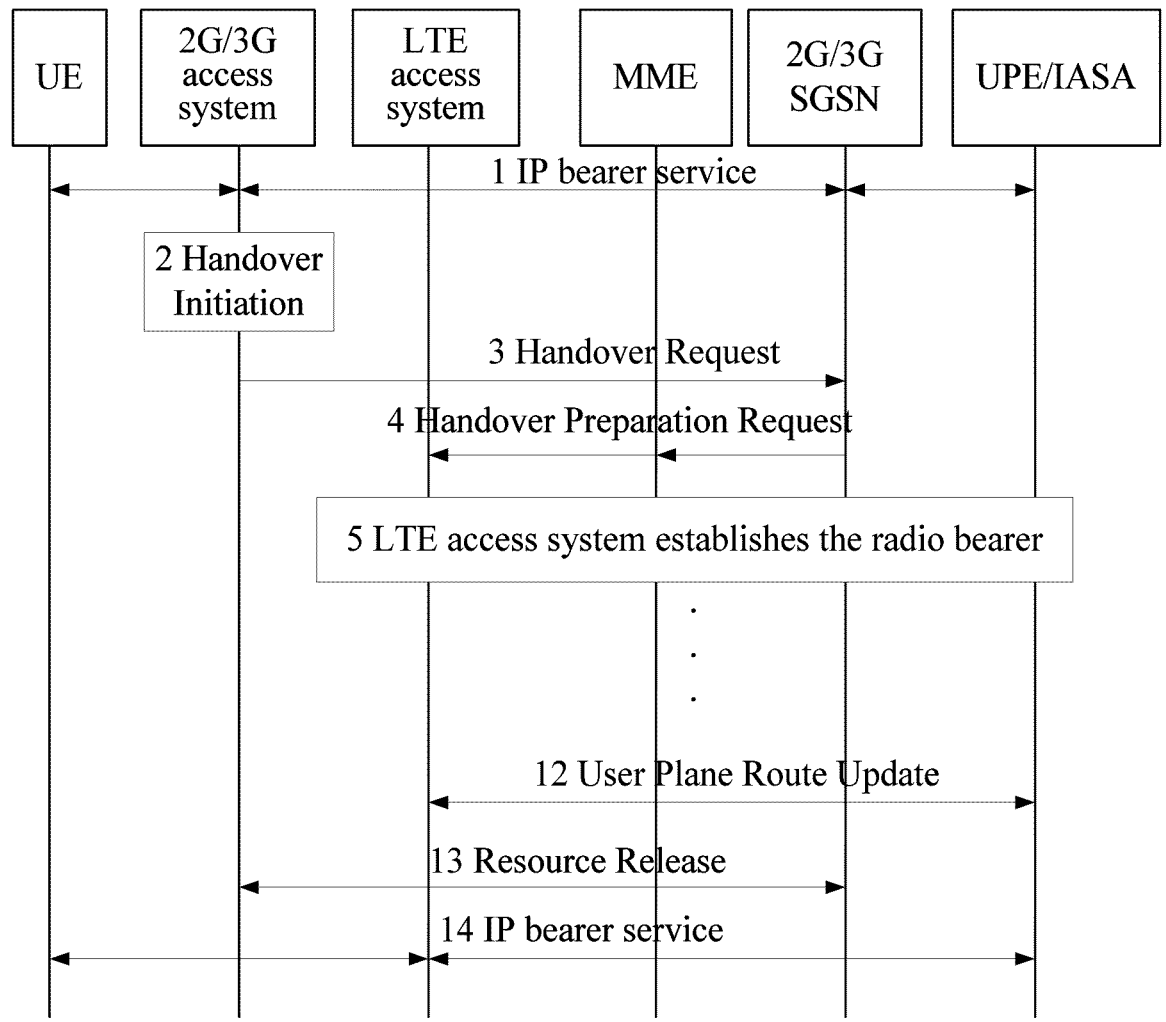
FIG. 8 is a flow chart of the handover signaling from the 2G/3G access system to the LTE access system of the method according to the fifth embodiment of the present disclosure.

Referring to FIG. 8, the process for the handover process from the 2G/3G access system to the LTE access system comprises the following steps:

In step 1, the IP bearer service is established between a UE, a 2G/3G access system, a 2G/3G SGSN and an SAE UPE/IASA.

In step 2, the 2G/3G access system decides to initiate a handover process to hand over to the LTE access system (Handover Initiation).

In step 3, the 2G/3G access system initiates a handover request message to the 2G/3G SGSN (Handover Required). The 2G/3G SGSN selects an MME to process the handover.

In step 4, the 2G/3G SGSN sends a handover preparation request message to the selected MME, and the UE context information comprised in the message contains the subscribed AMBR parameter of the user. The MME creates a UE context according to the context information in the received handover preparation request message, and sends the handover preparation request message (carrying the AMBR parameter of the user) to the LTE access system (Handover Preparation Request).

In step 5, after receiving the handover preparation request message sent by the MME, the LTE access system reserves the resources of the user plane, and establishes a radio bearer (LTE Access reserves UP resources).

Steps 6 to 11 are similar to steps 6 to 11 of the method according to the third embodiment, and are not shown in FIG. 8.

In step 12, the UPE/IASA establishes the route of the user plane to the LTE access system (User Plane route update), and informs the UPE/IASA of the AMBR parameter of the user.

This step can be performed through one of the following methods:

In the first method, the LTE access system sends a route modification message to the UPE/IASA to modify the user plane route of the UPE/IASA to the LTE access system; the message carries the AMBR parameter of the user.

In the second method, the MME sends a route modification message to the UPE/IASA to modify the user plane route of the UPE/IASA to the LTE access system; the message carries the AMBR parameter of the user.

In step 13, the source 2G/3G access system releases the resources (Resource Release).

In step 14, the IP bearer service is established between the UE, the LTE access system and the UPE/IASA.

Figure 9:
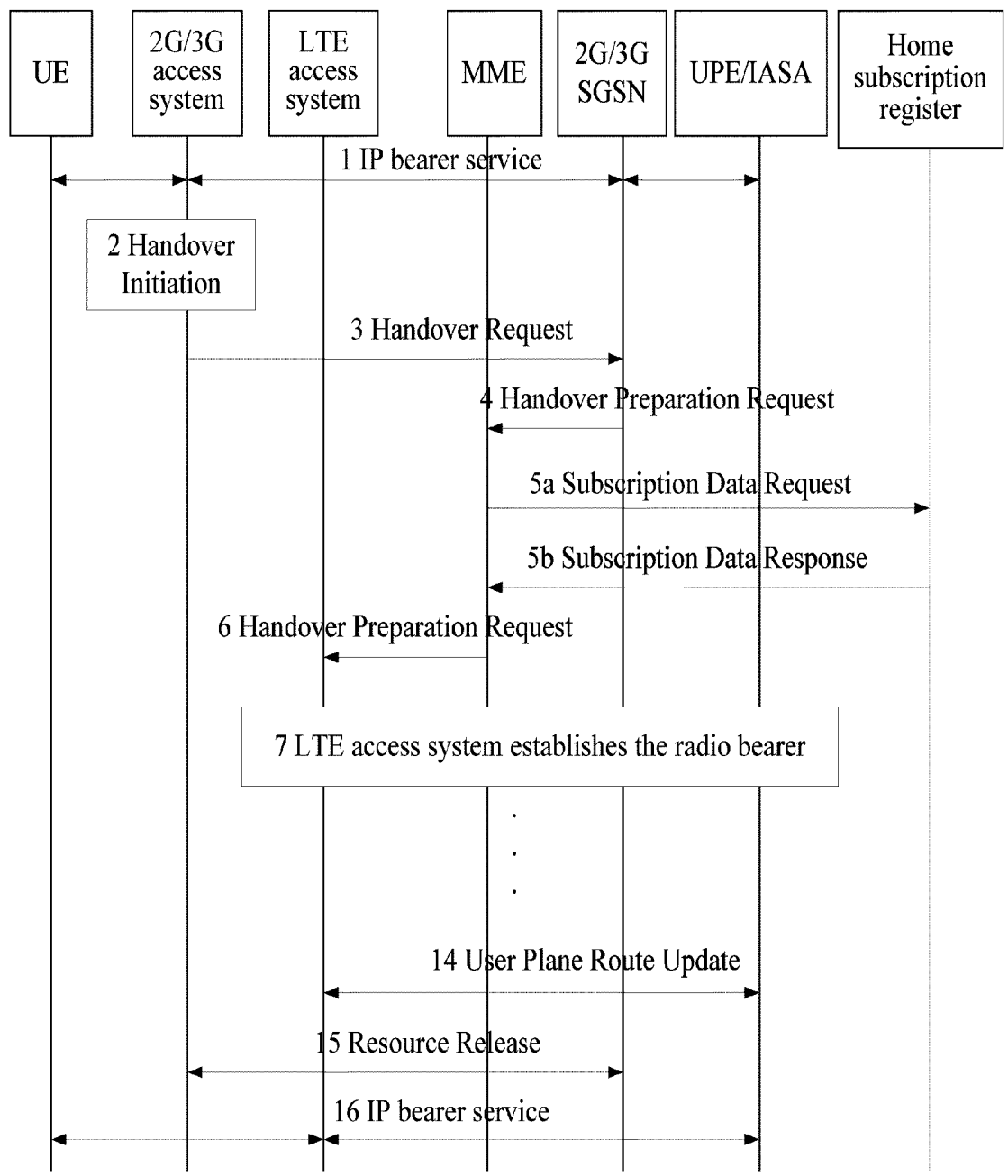
FIG. 9 is a flow chart of the signaling of the method according to a sixth embodiment of the present disclosure.

In the method according to the sixth embodiment, the AMBR is configured in an HSS; during a handover process from the 2G/3G to the SAE system, the MME sends a message to the HSS, and acquires the subscription data in the HSS, and then the MME informs the LTE access system of the AMBR in the subscription data. Referring to FIG. 9, the method comprises the following steps:

In step 1, the IP bearer service is established between a UE, a 2G/3G access system, a 2G/3G SGSN and an SAE UPE/IASA.

In step 2, the 2G/3G access system decides to initiate a handover process to hand over to the LTE access system (Handover Initiation).

In step 3, the 2G/3G access system initiates a handover request message to the 2G/3G SGSN (Handover Required). The 2G/3G SGSN selects an MME to process the handover.

In step 4, the 2G/3G SGSN sends a handover preparation request message to the selected MME.

In step 5*a*, the MME sends an acquire subscription data request message to the HSS. In step 5*b*, the HSS returns the SAE subscription data of the user to the MME; the SAE subscription data comprises the subscribed AMBR parameter of the user.

In step 6, the MME creates a context of the UE and sends a handover preparation request message to the LTE access system (Handover Preparation Request), and carries the subscribed AMBR parameter of the user in the handover preparation request message to the LTE access system.

In step 7, after receiving the handover preparation request message sent by the MME, the LTE access system reserves the resources of the user plane, and establishes a radio bearer (LTE Access reserves UP resources).

Steps 8 to 13 are similar to steps 6 to 11 of the method according to the third embodiment, and are not shown in FIG. 9.

In step 14, the UPE/IASA establishes the route of the user plane to the LTE access system (User Plane route update), and informs the UPE/IASA of the AMBR parameter of the user.

This step can be performed through one of the following methods:

In the first method, the LTE access system sends a route modification message to the UPE/IASA to modify the user plane route of the UPE/IASA to the LTE access system; the message carries the AMBR parameter of the user.

In the second method, the MME sends a route modification message to the UPE/IASA to modify the user plane route of the UPE/IASA to the LTE access system; the message carries the AMBR parameter of the user.

In step 15, the source 2G/3G access system releases the resources (Resource Release).

In step 16, the IP bearer service is established between the UE, the LTE access system and the UPE/IASA.

In the method according to the seventh embodiment, the AMBR parameter is configured in an SPR; the user uses a PCC mechanism when activated in the 2G/3G system to acquire the AMBR parameter configured in the SPR, and then stores the AMBR parameter in a PDP context or an MM context; during a handover process from the 2G/3G to the SAE system, the SGSN transmits the AMBR parameter to the MME; the MME acquires the transmitted AMBR parameter, and then informs the LTE access system.

Figure 10:
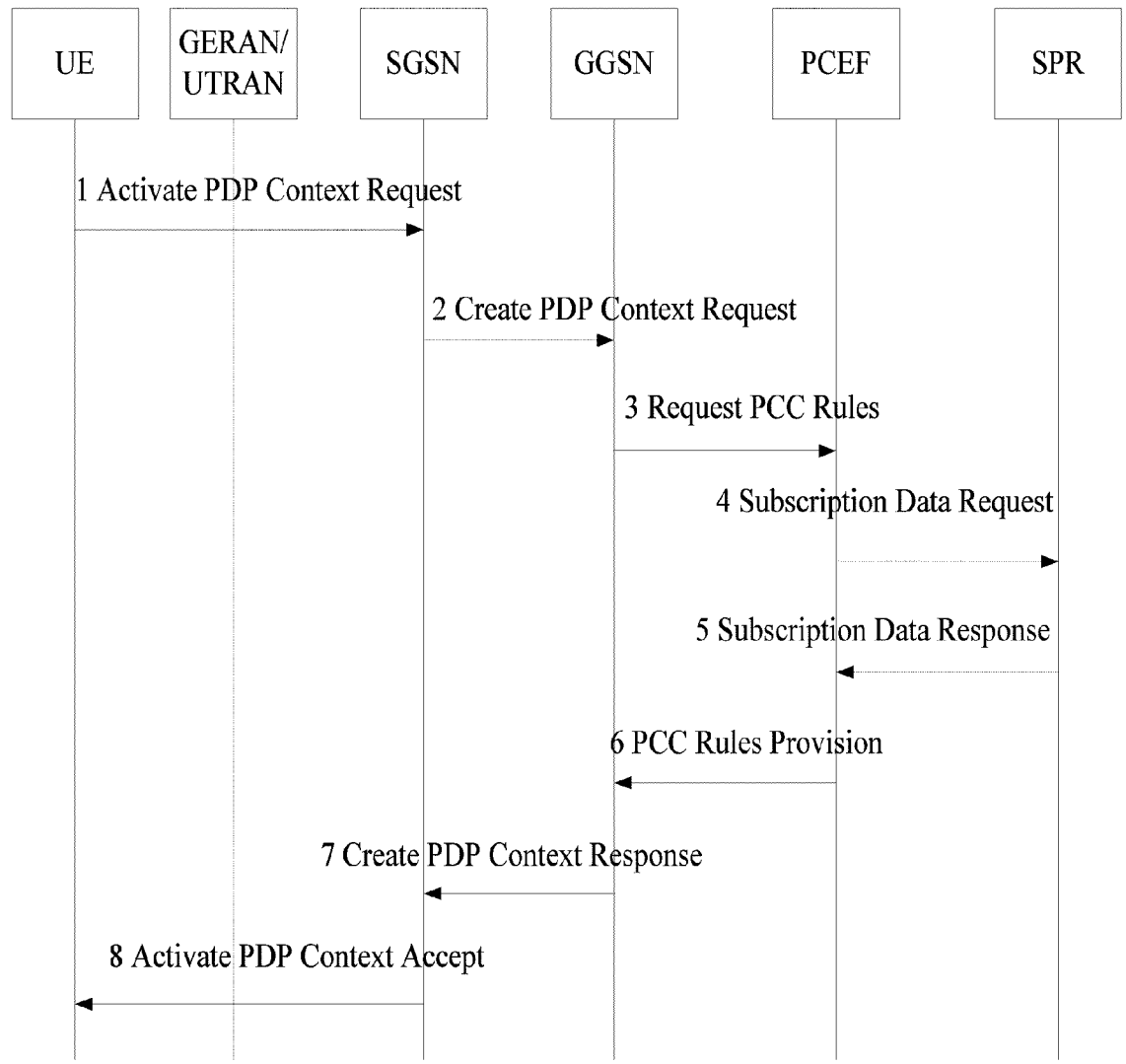
FIG. 10 is a flow chart of the signaling of the method according to a seventh embodiment of the present disclosure.

Referring to FIG. 10, the activation process of the user in the 2G/3G access system comprises the following steps:

In step 1, the UE sends an activate PDP context request message to an SGSN.

In step 2, the SGSN sends a create PDP context request message to a GGSN.

In step 3, the GGSN sends a PCC rules request message to a PCRF, and requests to acquire a PCC rule corresponding to the PDP context.

In step 4, the PCRF does not have subscription data of the user, and sends a subscription data request message to the SPR to acquire the subscription data of the user.

In step 5, the SPR returns a subscription data response carrying the subscription data of the user, comprising the subscribed AMBR parameter of the user.

In step 6, the PCRF stores the subscription data of the user, and then returns a PCC rules provision message carrying the PCC rule and the subscribed AMBR parameter of the user to the GGSN.

In step 7, the GGSN returns a create PDP context response message carrying the subscribed AMBR parameter of the user to the SGSN.

In step 8, the SGSN stores the AMBR parameter of the user into the context, and returns an activate PDP context response message.

The process for handover from the 2G/3G to the SAE system is the same as the process in the fourth embodiment.

Figure 11:
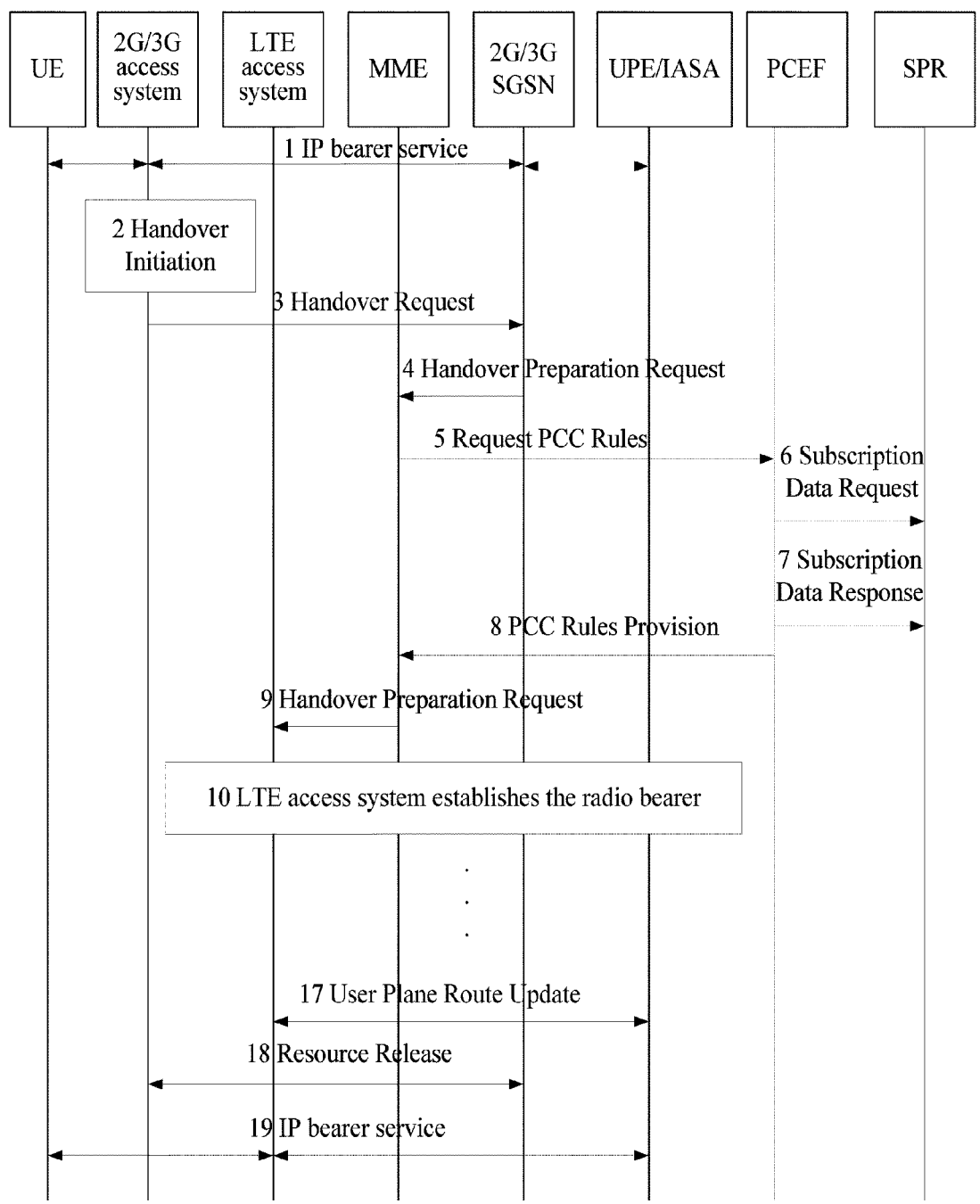
FIG. 11 is a flow chart of the signaling of the method according to an eighth embodiment of the present disclosure.

In the method according to the eighth embodiment, the AMBR parameter is configured in an SPR; during a handover process from the 2G/3G to the SAE system, the MME uses a PCC mechanism to acquire the AMBR parameter subscribed in the SPR, and then informs the LTE access system. Referring to FIG. 11, the method comprises the following steps:

In step 1, the IP bearer service is established between a UE, a 2G/3G access system, a 2G/3G SGSN and an SAE UPE/IASA.

In step 2, the 2G/3G access system decides to initiate a handover process to hand over to the LTE access system (Handover Initiation).

In step 3, the 2G/3G access system initiates a handover request message to the 2G/3G SGSN (Handover Required). The 2G/3G SGSN selects an MME to process the handover.

In step 4, the 2G/3G SGSN sends a handover preparation request message to the selected MME.

In step 5, the MME sends a PCC rules request message to the PCRF, requesting the PCC rule of the user.

In step 6, the PCRF has no subscription data of the user, and the PCRF sends a subscription data request message to the SPR to acquire the subscription data of the user.

In step 7, the SPR returns a subscription data response carrying the subscription data of the user, comprising the AMBR parameter of the user.

In step 8, the PCRF stores the subscription data of the user, and then returns a PCC rules provision message carrying the PCC rule and the AMBR parameter of the user to the MME.

In step 9, the MME creates a context of the UE and sends the handover preparation request message to the LTE access system (Handover Preparation Request), and carries the subscribed AMBR parameter of the user in the handover preparation request message to the LTE access system.

In step 10, after receiving the handover preparation request message sent by the MME, the LTE access system reserves the resources of the user plane, and establishes a radio bearer (LTE Access reserves UP resources).

Steps 11 to 16 are similar to steps 6 to 11 of the method according to the third embodiment, and are not shown in FIG. 9.

In step 17, the UPE/IASA establishes the route of the user plane to the LTE access system (User Plane route update), and informs the UPE/IASA of the AMBR parameter of the user.

This step can be performed through one of the following methods.

In the first method, the LTE access system sends a route modification message to the UPE/IASA to modify the user plane route of the UPE/IASA to the LTE access system; the message carries the AMBR parameter of the user.

In the second method, the MME sends a route modification message to the UPE/IASA to modify the user plane route of the UPE/IASA to the LTE access system; the message carries the AMBR parameter of the user.

In step 18, the source 2G/3G access system releases the resources (resource release).

In step 19, the IP bearer service is established between the UE, the LTE access system and the UPE/IASA.

Figure 12:
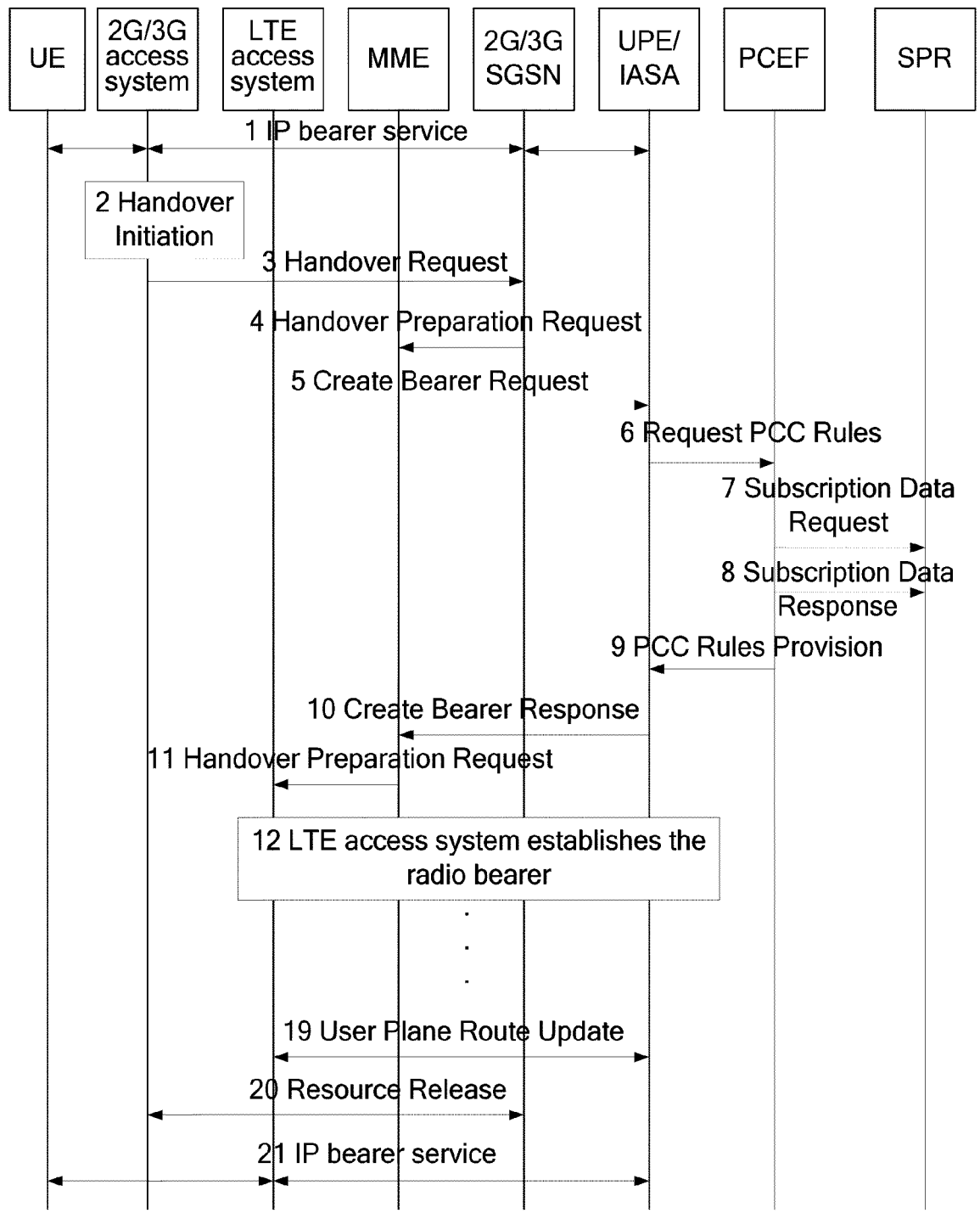
FIG. 12 is a flow chart of the signaling of the method according to a ninth embodiment of the present disclosure.

In the method according to the ninth embodiment, the AMBR parameter is configured in the SPR; during a handover process from the 2G/3G to the SAE system, the MME triggers a create process of a default bearer; the MME sends a message to a UPE/3GPP anchor to inform the UPE/3GPP anchor of the creation of the default bearer; the UPE/3GPP anchor sends a message to the PCRF to acquire the AMBR parameter in the SPR subscribed by the user, and then transmits the parameter to the MME; the MME acquires the transmitted AMBR parameter, and then informs the LTE access system. Referring to FIG. 12, the method comprises the following steps.

In step 1, the IP bearer service is established between a UE, a 2G/3G access system, a 2G/3G SGSN, and an SAE UPE/IASA.

In step 2, the 2G/3G access system decides to initiate a handover process to hand over to the LTE access system (handover initiation).

In step 3, the 2G/3G access system initiates a handover request message to the 2G/3G SGSN (Handover Required). The 2G/3G SGSN selects an MME to process the handover.

In step 4, the 2G/3G SGSN sends a handover preparation request message to the selected MME.

In step 5, the MME sends a create bearer request message to the UPE/IASA, requesting to create a default bearer.

In step 6, the UPE/IASA requests a PCC rules request message to the PCRF, requesting to acquire the PCC rule of the default bearer.

In step 7, the PCRF does not have subscription data of the user, and sends a subscription data request message to the SPR to acquire the subscription data of the user.

In step 8, the SPR returns a subscription data response carrying the subscription data of the user, comprising the AMBR parameter of the user.

In step 9, the PCRF stores the subscription data of the user, and then returns a PCC rule provision message carrying the PCC rule and the AMBR parameter of the user to the UPE/IASA.

In step 10, the UPE/IASA returns a create bearer response message carrying the AMBR parameter of the user to the MME.

In step 11, the MME creates a context of the UE and sends a handover preparation request message to the LTE access system (Handover Preparation Request), and carries the subscribed AMBR parameter of the user in the handover preparation request message to the LTE access system.

In step 12, after receiving the handover preparation request message sent by the MME, the LTE access system reserves the resources of the user plane, and establishes a radio bearer (LTE Access reserves UP resources).

Steps 13 to 18 are similar to steps 6 to 11 of the method according to the third embodiment, and are not shown in FIG. 12.

In step 19, the UPE/IASA establishes the route of the user plane to the LTE access system (User Plane route update).

In step 20, the source 2G/3G access system releases resources (Resource Release).

In step 21, the IP bearer service is established between the UE, the LTE access system, and the UPE/IASA.

It should be noted that, for the convenience of illustration, the embodiments of the present disclosure are described on the basis of the architecture of the independent MME logical function entity and the integrated UPE and IASA logical function entities; however, the present disclosure does exclude the other location combinations of the above logical entities in the core network, such as the integrated MME/UPE logical function entities, the independent IASA logical function entity, the integrated MME/UPE/IASA logical function entity, or the separate MME/UPE/IASA logical function entities.

Figure 13:
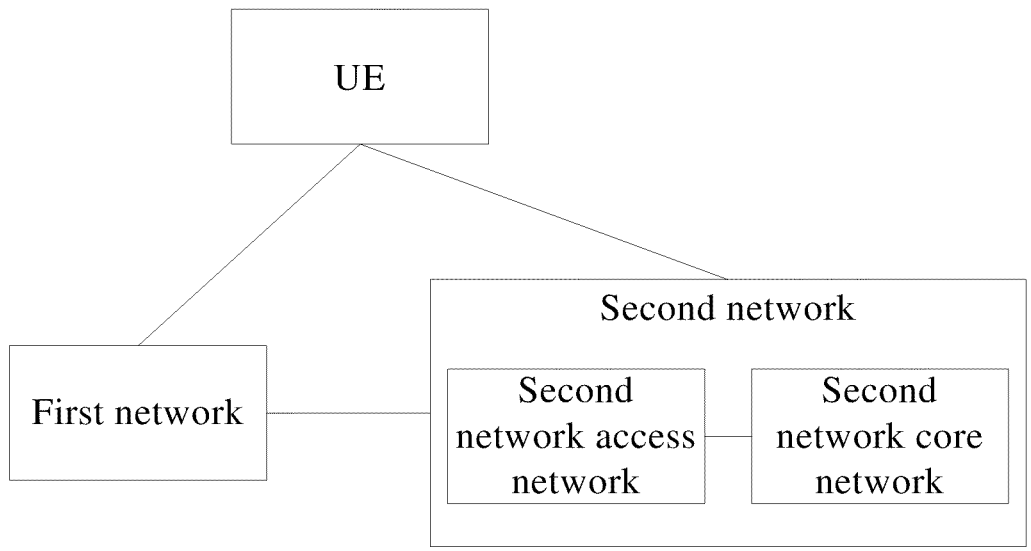
FIG. 13 is a schematic view of the network system structure according to an embodiment of the present disclosure.

Referring to FIG. 13, an embodiment of the present disclosure further provides a network system, comprising a UE, a first network and a second network. The second network comprises a second network core network and a second network access network.

A second network mobility management network element is adapted to acquire QoS of the UE during a handover process of the UE from the first network to the second network, and transmit the QoS to the second network access network.

The second network access network is adapted to receive the QoS transmitted by the second network mobility management network element.

Further, the second network mobility management network element may acquire the QoS of the UE through one of the following methods:

In the first method, the second network mobility management network element acquires the QoS according to a preset policy.

In the second method, the first network is adapted to acquire the subscribed QoS for the UE from a subscription database in which the QoS is configured when the UE is connected, and inform the second network mobility management network element of the QoS. The second network mobility management network element is adapted to receive the QoS of the first network.

In the third method, the second network mobility management network element is adapted to acquire the subscribed QoS for the UE from a subscription database in which the QoS is configured.

Referring to FIG. 13, an embodiment of the present disclosure further provides a network system, comprising a UE, a first network and a second network. The second network comprises a user plane network element and/or a second network access network.

The second network access network element and/or the user plane network element is adapted to acquire QoS of the UE according to a preset policy during a handover process of the UE from the first network to the second network.

The acquiring the QoS of the UE according to the preset policy may be performed through one of the following methods.

In the first method, a default QoS configured in the second network access network element and/or the user plane network element is used as the QoS of the UE.

In the second method, the second network further comprises a second network mobility management network element. The second network access network element and/or the user plane network element is adapted to acquire QoS parameter values transmitted by the second network mobility management network element, and accumulate the acquired QoS parameter values as the QoS of the UE.

In the third method, the second network further comprises a second network mobility management network element. The second network access network element and/or the user plane network element is adapted to acquire QoS parameter values transmitted by the second network mobility management network element, and select the maximum value among the values as the QoS of the UE.

Further, the network system further comprises a subscription database. After the handover process of the UE with the QoS acquired according to the preset policy is completed, the second network mobility management network element acquires the subscribed QoS of the UE from the subscription database, and transmits the QoS to the second network access network element and/or the user plane network element.

Alternatively, after the handover process of the UE with the QoS acquired according to the preset policy is completed, the second network mobility management network element acquires the subscribed QoS of the UE from the subscription database, and compares the subscribed QoS of the UE with the QoS acquired according to the preset policy; if the comparison result indicates that they are inconsistent, the second network mobility management network element transmits the subscribed QoS of the UE to the second network access network and/or the user plane network element.

Figure 14:
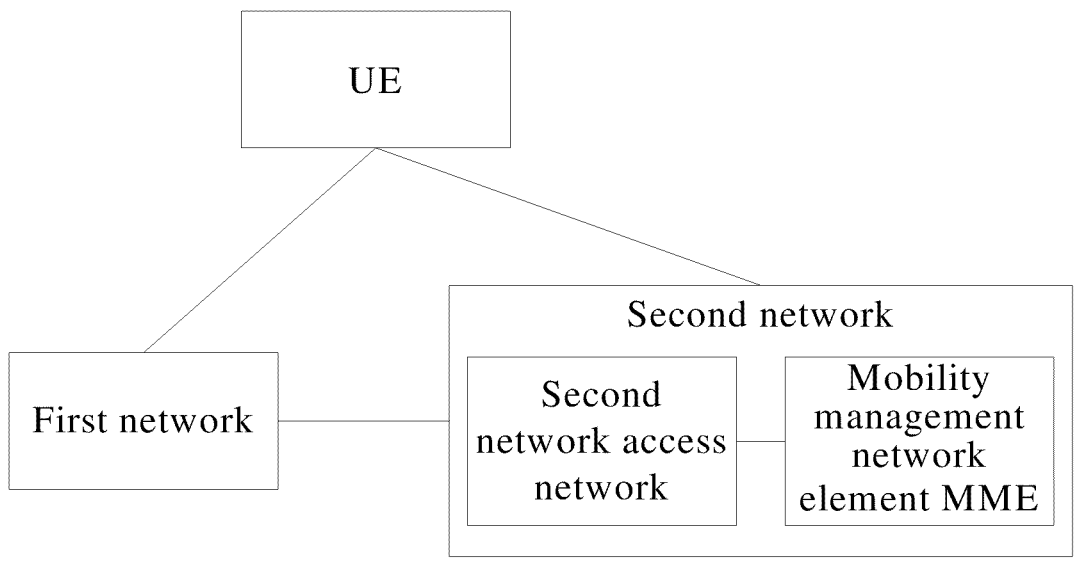
FIG. 14 is a structure view of the specific implementation of the network system according to an embodiment of the present disclosure.

Referring to FIG. 14, in the specific implementation of the above system, the second network mobility management network element may comprise a mobility management network element (for example, the MME in an evolved network). The mobility management network element is adapted to acquire the QoS of the UE during a handover process of the UE from the first network to the second network, and transmit the QoS to the second network access network.

An embodiment of the present disclosure further provides a destination network, comprising a core network, and an access network and/or a user plane network element.

The core network is adapted to acquire QoS of a UE that initiates a handover process, and transmit the QoS to the access network and/or the user plane network element. The core network acquires the QoS according to a preset policy, or acquires the subscribed QoS of the UE from a subscription database in which the QoS is configured.

The access network and/or the user plane network element is adapted to receive the QoS transmitted by the core network.

An embodiment of the present disclosure further provides a destination network, comprising an access network and/or a user plane network element.

The access network and/or the user plane network element is adapted to acquire QoS of a UE according to a preset policy during a handover process of the UE from a first network to a second network. The preset policy is one of the following:

In the first preset policy, a default QoS configured in the second network access network element and/or the user plane network element is used as the QoS of the UE.

In the second preset policy, the second network access network element and/or the user plane network element acquire, from the second network mobility management network element, the QoS parameter values transmitted by the UE from the first network, and accumulate the acquired QoS parameter values as the QoS of the UE.

In the third preset policy, the second network access network element and/or the user plane network element acquire, from the second network mobility management network element, the QoS parameter values transmitted by the UE from the first network, and select the maximum value among the values as the QoS of the UE.

Figure 15:
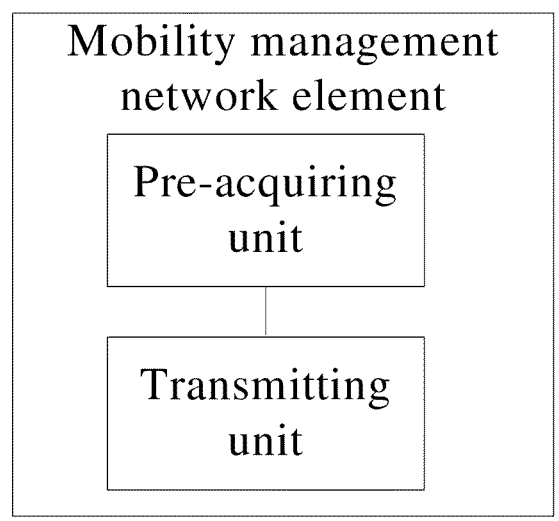
FIG. 15 is a schematic structural view of the mobility management network element according to an embodiment of the present disclosure.

Referring to FIG. 15, an embodiment of the present disclosure further provides a mobility management network element, comprising a pre-acquiring unit and a transmitting unit.

The pre-acquiring unit is adapted to acquire QoS of a UE which initiates a handover process according to a preset policy.

The transmitting unit is adapted to send the QoS acquired by the pre-acquiring unit.

To sum up, in the embodiments of the present disclosure, during a handover process of the UE from the first network to the second network, the second network mobility management network element acquires the QoS of the UE, and transmits the acquired QoS to the second network access network and/or the user plane network element, so that the second network access network and/or the user plane network element acquire the QoS. Alternatively, the second network access network and/or the user plane network element acquire the QoS of the UE according to the preset policy.

Thus, after the second network access network and/or the user plane network element acquire the QoS, a radio bearer and a user plane bearer can be established according to the QoS, so as to complete the handover process of the UE between systems.

It can be understood by persons of ordinary skill in the art that, all or a part of the steps in the methods according to the above embodiments may be implemented through hardware instructed by a program. The program may be stored in a computer readable storage media. When executed, the program may comprise the steps described in the embodiments 1, 2, 3, 4, 5, 6, 7 and 8 respectively. The storage media is, for example, a ROM/RAM, a magnetic disk, or an optical disk.

It will be apparent to those skilled in the art that various modifications and variations can be made to the present disclosure without departing from the scope or spirit of the present disclosure. In view of the foregoing, it is intended that the present disclosure cover modifications and variations of this disclosure provided that they fall within the scope of the following claims and their equivalents.

What is claimed is:

1. A method for transmitting Quality of Service (QoS) parameter during a handover process between systems, wherein during the handover process of a User Equipment (UE) from a first network to a second network, the method comprises:
   acquiring, by a second network mobility management network element, a first QoS of the UE, wherein the first network is a 2G/3G system, the second network is a System Architecture Evolution (SAE) system, and the acquiring the first QoS of the UE comprises: using default QoS configured in the second network mobility management network element as the first QoS of the UE;
   transmitting, by the second network mobility management network element, the acquired first QoS to at least one of a second network access network and a user plane network element;
   acquiring by the second network mobility management network element, subscribed QoS of the UE from subscription database,
   comparing the subscribed QoS of first QoS; and
   if a comparison result indicates that the subscribed QoS of the UE and the first QoS are inconsistent, transmitting, by the second network mobility management network element, the subscribed QoS of the UE to the at least one of the second network access network and the user plane network element.

2. The method of claim 1, wherein after transmitting, by the second network mobility management network element, the acquired first QoS to the at least one of the second network access network and the user plane network element, the method further comprises:
  acquiring, by the second network mobility management network element, the subscribed QoS for the UE from the subscription database; and
  transmitting the subscribed QoS to the at least one of the second network access network and the user plane network element.

3. A system comprising: a second network mobility management network element, and at least one of a second network access network element and a user plane network element, wherein
  the second network mobility management network element is adapted to acquire a first Quality of Service (QoS) of a User Equipment (UE) during a handover process of the UE from the first network to the second network, and transmit the first QoS to the at least one of the second network access network element and the user plane network element, wherein the first network is a 2G/3G system, the second network is a System Architecture Evolution (SAE) system, and the second network mobility management network element is adapted to use default QoS configured in the second network mobility management network element as the first QoS of the UE, the second network mobility management network element is adapted to acquire subscribed QoS of the UE from subscription database, to compare the subscribed QoS of the UE with the first QoS, and if a comparison result indicates that the subscribed QoS of the UE and the first QoS are inconsistent, to transmit the subscribed QoS of the UE to the at least one of the second network access network and the user plane network element; and
  the at least one of the second network access network element and the user plane network element is adapted to receive the first QoS transmitted by the second network mobility management network element.

4. A destination network, comprising:
  a mobility management network element, adapted to acquire a first Quality of Service (QoS) of a User Equipment (UE) during a handover process of the UE from a first network to a second network, and transmit the first QoS to at least one of an access network and a user plane network element, wherein the first network is a 2G/3G system, the second network is a System Architecture Evolution (SAE) system, and the mobility management network element is adapted to use default QoS configured in the mobility management network element as the first QoS of the UE, wherein the mobility management network element is further adapted to acquire subscribed QoS of the UE from subscription database to compare the subscribed QoS of the UE with the first QoS; and if a comparison result indicates that the subscribed QoS of the UE and the first QoS are inconsistent, to transmitting the subscribed QoS of the UE to the at least one of the second network access network and the user plane network element;
  the access network and/or the user plane network element, adapted to receive the first QoS transmitted by the mobility management network element and to receive the subscribed QoS of the UE transmitted by the mobility management network element.

5. A mobility management network element, comprising:
  a pre-acquiring unit, adapted to acquire a first Quality of Service (QoS) of a User Equipment (UE) during a handover process of the UE from a first network to a second network, wherein the first network is a 2G/3G system, the second network is a System Architecture Evolution (SAE) system, and the pre-acquiring unit is adapted to use default QoS configured in the mobility management network element as the first QoS of the UE;
  a transmitting unit, adapted to send the first QoS acquired by the pre-acquiring unit;
  wherein after the handover process, the mobility management network element is further adapted to acquire subscribed QoS for the UE from subscription database; and compare the subscribed QoS of the UE with the first QoS;
  if a comparison result indicates that the subscribed QoS of the UE and the first QoS are inconsistent, the transmitting unit is further adapted to transmit the subscribed QoS to the second network access network and/or the user plane network element.

6. A method for transmitting Quality of Service (QoS) parameter during a handover process between systems, wherein during the handover process of a User Equipment (UE) from a first network to a second network, the method comprises:
  receiving, by a second network access network, a first QoS of the UE from a second network mobility management network element, wherein the first network is a 2G/3G system, the second network is a System Architecture Evolution (SAE) system, and the first QoS is default QoS configured in the second network mobility management network element~
  receiving, by the second network access network a subscribed QoS of the UE from the second network mobility management network element, wherein the subscribed QoS of the UE is sent by the second network mobility management network element after the handover process, if the subscribed QoS of the UE and the first QoS are inconsistent.

7. A second network access network, comprising:
  during a handover process of a User Equipment (UE) from a first network to a second network,
  a receiver, adapted to receive a first Quality of Service (QoS) of a UE from a second network mobility management network element, wherein the first network is a 2G/3G system, the second network is a System Architecture Evolution (SAE) system, and the first QoS is default QoS configured in the second network mobility management network element, and further adapted to receive a subscribed QoS of the UE from the second network mobility management network element, wherein the subscribed QoS of the UE is sent by the second network mobility management network element after the handover process, if the subscribed QoS of the UE and the first QoS are inconsistent.

* * * * *